Patented Jan. 15, 1929.

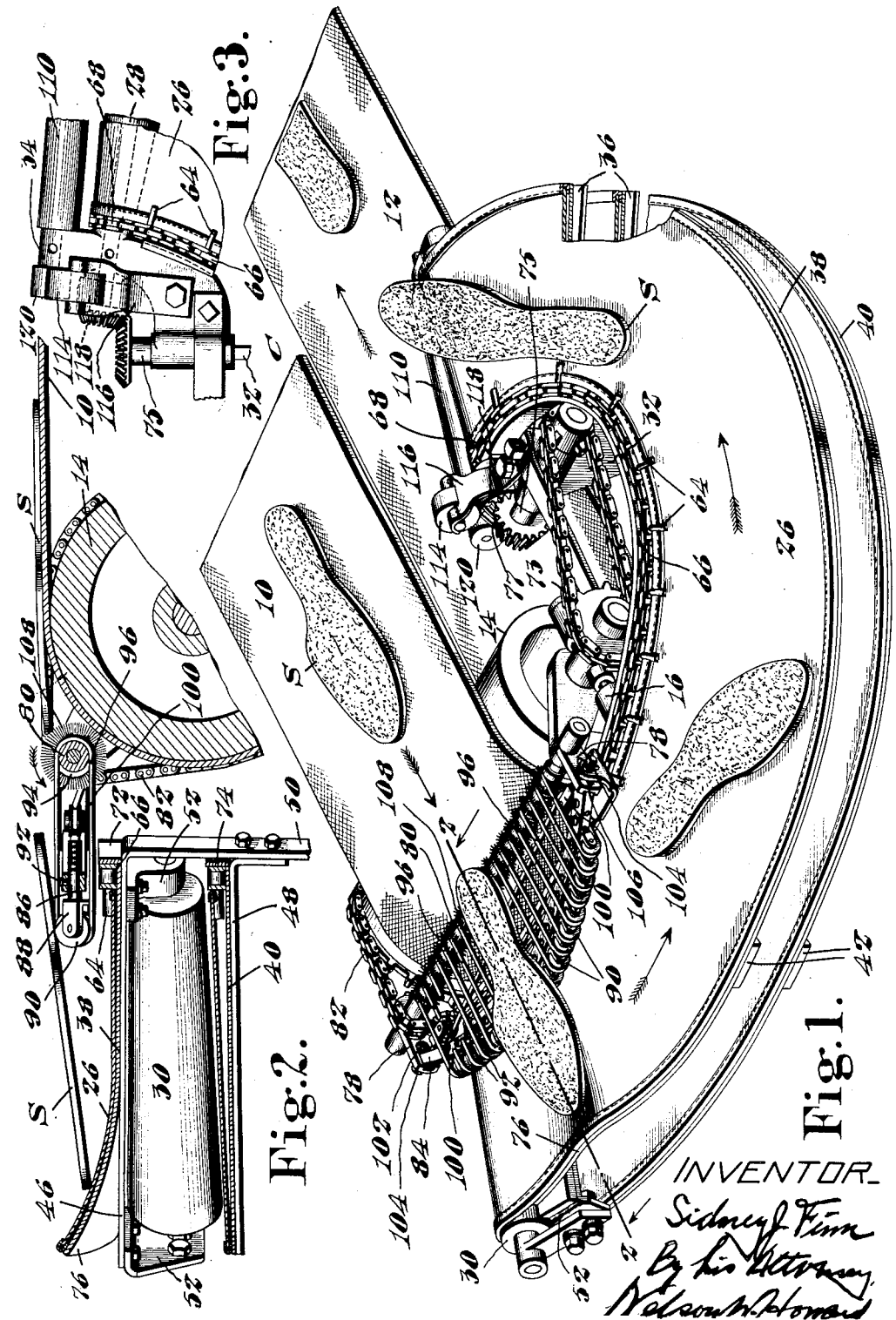

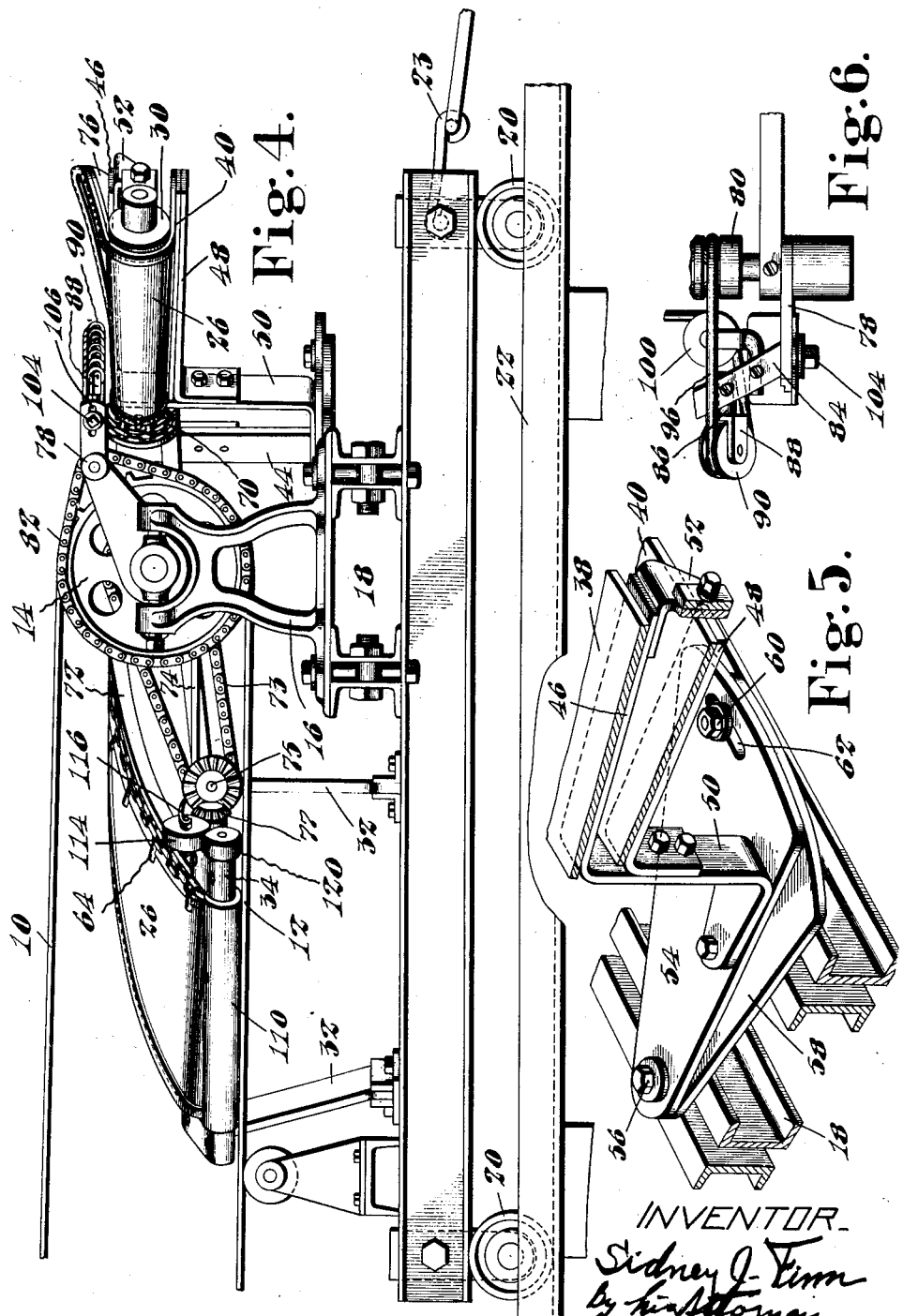

1,698,786

UNITED STATES PATENT OFFICE.

SIDNEY J. FINN, OF BEVERLY, MASSACHUSETTS, ASSIGNOR TO UNITED SHOE MACHINERY CORPORATION, OF PATERSON, NEW JERSEY, A CORPORATION OF NEW JERSEY.

CONVEYING SYSTEM.

Application filed January 18, 1924. Serial No. 687,023.

This invention relates to conveying systems, as those by which objects to be dried, such as adhesive-coated shoe-soles or other shoe parts, are carried for a considerable distance, and, to gain economy in space, in different directions, as forward upon one run of a belt and back upon the other run.

An object of the invention is to provide a simple and effective mechanism for transferring the objects between the different conveying portions of the system.

In the attainment of this end, a feature of the invention consists of main conveying means which is preferably endless, being best furnished by a belt, with its upper and lower runs connected by a unitary transferring member movable from one run to the other and preferably also in the form of a belt. By such a structure, a complete reversal of the position of the objects may be effected, so that each received from one conveying portion is deposited at a diametrically opposite point upon another conveying portion for reverse travel. In the present instance, the connecting or transfer-belt has its edges curved about a center lying at one side of it, and is supported by arcuate walls extending helically. Walls at the inner sides of these supporting walls guide the transfer-belt in the desired curved path, it, as shown, operating over rolls at the extremities of the walls, and being driven by a sprocket-chain and co-operating sprocket-wheels. To maintain the conveying surface of the transfer-belt properly extended upon the supporting walls, its rolls may be relatively adjustable to vary the distance between them, this adjustment occurring in the direction of extension of the arc along which the transfer-belt is curved. At its outer edge, preferably opposite the main conveyor, this belt is shown as higher than at the inner edge, to guard against the conveyed objects overrunning at this point.

To insure the correct delivery of the objects from one belt to another, as from the main belt to the transfer-belt extending across its end, I furnish, as another feature of the invention, conveying means for bridging the space between the two, and consisting of a movable conveyor device, which projects for different distances over the second belt. By making this projection decrease in the direction of travel as the conveyed object proceeds upon the second or transfer-belt, the intermediate conveying device may be kept clear of the object, to avoid its displacement. This arrangement of the connecting conveyor device may be facilitated by employing for it, means, which is also useful in other connections, consisting of a unitary belt having a plurality of runs decreasing in length in the direction of advance of conveyed objects. The particular form of connecting belt illustrated extends in successive runs along a single roll adjacent to the extremity of one conveyor and over a series of rolls spaced from the single roll, said belt returning from its last run to the starting point. A curved bar, upon which the series of rolls is mounted, aids in obtaining the desired form of the delivery-end of the connecting conveyor, this bar being movable to facilitate adjustment of the tension of the conveyor.

Objects bearing an adhesive, as may be the case with those carried by the present system, tend to cling to the conveying surface, so there may be failure to deliver them to a receiving surface. A further feature of the invention lies in means for overcoming this tendency, this means consisting of a movable member having projections operating in substantial contact with the conveying surface and arranged to lift adhering objects therefrom, as by the effect of a series of fibers movable upwardly against the descending portion of the conveyor-belt. When this feature is associated with a device of the type of the connecting belt previously outlined, I place the fibers in circumferential series between the runs of this belt.

One of the several embodiments which my invention may assume is illustrated in the accompanying drawings, Fig. 1 being a perspective view of the improved conveying system;

Fig. 2, a transverse section therethrough on the line 2—2 of Fig. 1;

Fig. 3, a top plan view of a portion of the driving mechanism at the lower portion of the transfer-belt;

Fig. 4, an elevation, looking at the inner side of said transfer-belt;

Fig. 5, a detail in perspective of the adjusting means for the upper end of the transfer-belt; and Fig. 6, a top plan view illustrating a portion of the means for guiding the connecting belt.

At C appears one end of a main conveyor-belt having separate conveying portions, furnished, respectively, by its upper run 10 and its lower run 12. The belt C operates over a roll 14 journaled in standards 16, and over a distant roll, not illustrated, the space through which the conveyor travels between its rolls giving a considerable interval of time during which the objects upon it may dry. The belt C is caused to advance in the direction of the arrows by power applied to either of its rolls. The standards 16 rise from a frame 18, at the under side of which are wheels 20 running upon tracks 22. Connections to the frame at 23 permit it to be moved to separate the supporting rolls of the conveyor C, and thus increase the tension upon it. Connecting the upper and lower runs of the belt C is a transfer-conveyor 26, also in the form of a belt, which is arcuate in form, being curved through substantially 180 degrees about a center adjacent to the edge of the main belt. The belt 26 operates over lower and upper rolls 28 and 30, respectively, journaled at the extremities of an arcuate carrier-frame. These rolls are shown as somewhat inclined longitudinally at their peripheries, being frusto-conical, with their larger ends outward. The roll 30 projects at the outer side of the run 10 of conveyor C, while the roll 28 is above and just within the opposite side of the lower run 12, the axes of the rolls extending in the same general direction, or at least substantially parallel to each other, and radial to the curve of the belt. Between these rolls, the frame gradually descends along a helix, so that the conveyor 26, which it carries, is of like form. Supporting one extremity of this carrier-frame upon the frame 18 are inclined standards 32, in bearing-blocks 34, 34 upon which the roll 28 is journaled. Mounted upon the inner standard are horizontal frame-arms 36, 36, spaced from each other vertically and extending horizontally beneath and fixed to upper and lower helical supporting walls 38 and 40, over which the corresponding runs of the transfer-belt 26 travel. At points between their ends, the walls 38 and 40 are secured to arms 42, 42 extending horizontally from a standard 44 rising from the frame 18. At their upper extremities, the walls 38 and 40 rest upon ledges furnished by horizontal arms 46 and 48 projecting from a standard 50 near the rear extremity of the frame 18. The roll 30 of the belt 26 is journaled in bearings 52 secured to the arm 46. The standard 50 carrying this arm is fixed to a sector-plate 54 pivoted at 56 upon a lower plate 58 bolted to the frame 18, so that by moving the plate 54 over its supporting plate 58 about the pivotal connection, the roll 30 may be carried away from the lower fixed roll 28 in the arcuate direction of extension of the belt 26, thus placing this belt under a tension which is substantially uniform at its opposite edges. By this means, the belt may be caused to lie smoothly upon its supporting walls. The adjustment may be fixed by means of a bolt 60 extending through a segmental slot 62 in the plate 54 and through the supporting plate 58. The loose connection of the portions of the belt-carrying frame at the points where the walls 38 and 40 rest upon the arms 46 and 48 permits this adjustment without interference with the continuity of support for the transfer-belt. The inner edge of this belt is secured to the flattened sides of studs 64 projecting outwardly from the links of a sprocket-chain 66, which chain passes over sprocket-wheels 68 and 70 upon the spindles of rolls 28 and 30, respectively. The chain is guided and retained in the desired helical path against inward movement by substantially vertical walls 72 and 74 rising from the inner edges of the supporting walls 38 and 40, respectively. That is, the chain and the belt secured to it, resting upon the walls 38 and 40, follow paths determined by the curvature of these walls and of the walls 72 and 74, with which the inner side of the chain contacts and along which it travels. The upper run of the belt, supported by the wall 38, presents a smooth conveying surface, while the support of the lower run by the wall 40 prevents it from sagging, and, by the tension produced, deforming such conveying surface. The belt 26 is shown as driven by sprocket-gearing 73, joining the spindle of the roll 14 to a short shaft 75 parallel to it and journaled in the inner bearing member 34, the latter shaft, in turn, being joined by bevel-gearing 77 to the spindle of the roll 28. As the belt 26 moves over the area opposite the delivery-end of the conveyor C, its outer edge is somewhat elevated, preferably by a raised portion 76 of the wall 38. This furnishes a guard against the ejection of the objects where they are delivered from the main conveyor upon the transfer-conveyor, the elevated portion resisting their tendency to be thrown outwardly at this point.

The arrangement of the upper extremity of the curved conveyor-belt 26 is such that it must be spaced for a substantial distance from the delivery-end of the main conveyor-belt. To carry the objects across this space, an intermediate conveying device is provided. Journaled in brackets 78, 78, extending horizontally from the upper portions of the standards 16, is a roll 80 having its axis parallel to that of the roll 14, and the upper portion of its periphery somewhat below the top of this roll 14 and above the surface of the conveyor 26. The roll 80 is rotated in the same direction and at approximately the same speed as the travel of the main conveyor, by sprocket-gearing 82 connecting it to the roll 14. Fixed in substantially horizontal arms of the brackets 78 is a bar 84, this being curved along a horizontal plane outwardly from the roll 80 to generally conform to the curvature of the transfer-conveyor. The centers of the two curves are, however, somewhat separated, so that in the direction of advance of this conveyor the bar preferably slightly diverges inwardly from the conveyor-curve. Spaced uniformly along the bar are horizontal bores to receive the spindles 86 of bearings 88 for narrow grooved rolls 90. The spindles may be adjustably held as to their projection from the bar and their angular relation about their axes by set-screws 92. Over this series of rolls 90, beginning at one side of the main conveyor, and over alined grooves 94 in the roll 80, pass the successive runs of a belt 96, the last run returning to the starting point, being guided at the extremes of this return-run by rolls 100. Variation in the tension of all the runs of the intermediate or connecting conveyor may be made simultaneously by movement of the bar 84, which is mounted at its ends in grooves 102 formed in horizontal portions of the brackets 78, and is fixed by screws 104 passing through horizontal slots 106 in the brackets. Since the roll 80 is quite close to the point at which objects leave the run 10 of the conveyor C, they are received by the connecting belt 96 with considerable certainty, and are carried fully over the transfer-conveyor, being somewhat lowered in passing from one conveyor to the other, so that they are less liable to be disarranged in their delivery. The narrow runs of the belt 96, which contact with the delivered objects, have little tendency to take therefrom any adhesive which may be upon their edges or under sides, so that this device does not become quickly soiled, and requires little cleaning. The spaced runs 96 also lend themselves to the prevention of interference with the delivered objects. Were the forward end of the device 96 to lie along a straight line parallel to the axis of the roll 14, which would be the case with a conveyor of the usual form, as the transfer-conveyor advanced the objects in a curved path past the end of the device 96, the latter would strike these objects and turn them at undesired angles upon the transfer-conveyor. Since, however, the ends of the successive belt-runs may be curved in the same path, or may diverge therefrom, the delivered objects will be entirely free from this displacing contact.

Due to the presence of adhesive upon the objects, or for other causes, after they have traveled with the run 10 of the conveyor C, they may stick thereto, and, especially if they are thin, may follow this conveyor over the roll 14, so that they are not received by the belt 96. To prevent this, doffing projections are caused to revolve upwardly over the end of the conveyor C. These projections, in the present instance, are in the form of a brush furnished by rows of fibers 108, such as bristles or fine wires surrounding the periphery of the roll 80, these rows being arranged in series between the successive grooves 94. The ends of the bristles move in substantial or actual contact with the surface of the conveyor C, and, as they rise, engage the ends of the advanced objects and lift them, carrying them positively forward upon the runs of the belt 96.

The delivery-end of the transfer-conveyor 26 is raised above the receiving surface 12 of the conveyor C to such an extent that the fall of the transferred objects from one to the other may cause them to be improperly positioned upon the surface 12. A gradual lowering of the objects is effected by a roll 110 journaled in the bearing-blocks 34. This roll is rotated in the desired direction, to correspond with the travel of the conveyor 26, by a friction-roll 114 pressed by a spring 116 against rolls 118 and 120, which are situated, respectively, at the ends of the roll 28 and the roll 110. The diameter of the roll 110 is such that its upper portion is below the delivery-surface of the conveyor 26, it stepping down the object passing over it, so that the change of direction is less abrupt, and the deposit is effected without disturbing the desired relation.

Assuming that soles, indicated at S in Fig. 1 of the drawings, have been coated upon one side with cement and delivered at the distant extremity of run 10 of the conveyor C, these soles are carried along and partially dried, and when reaching the roll 14 come into contact with the revolving fibers 108, and are lifted thereby and directed upon the connecting conveyor 96. This carries the soles across the open space between the main conveyor and the conveyor 26, and when their forward ends reach the upper surface of the latter conveyor, they are checked in their travel by the elevation at 76. While their rear portions still rest upon the connecting conveyor, they are partially turned by the travel of the transferring conveyor, so that they lie angularly across it. In their movement forward upon the latter, they pass clear of the end of the connecting conveyor, because of the curvature of this, and travel on to be delivered upon the roll 110. This lowers them while continuing their advance, and when their ends strike the lower run 12 of the conveyor C, the latter exerts upon them a force which further angularly deflects them, so they are received by the lower run with their axes in the direction of movement, precisely as they were upon the upper run, they having been carried by the transfer-conveyor through substantially 180 degrees. Now the full length of the lower run 12 of the main conveyor is available for the drying action, so that the time of this is doubled without the employment of more drying mechanism or the occupation of more space than that involved with the single main conveyor.

Having described my invention, what I claim as new and desire to secure by Letters Patent of the United States is:

1. In a conveying system, an endless conveyor having upper and lower runs, and a unitary member movable from one run to the other and arranged to transfer objects between the runs and to deposit them at different angles than they occupied upon the initial run.

2. In a conveying system, an endless conveyor having upper and lower runs, and a unitary traveling transfer-belt receiving objects from the upper run of the conveyor and delivering to the lower run.

3. In a conveying system, a main conveyor-belt, and a curved transfer-belt extending across the end of the main belt and terminating at the lower run of said main belt.

4. In a conveying system, a main conveyor-belt, and a curved transfer-belt extending across the end of the main belt and terminating at the lower run of said main belt, the outer edge of the transfer-belt having a portion higher than the inner edge.

5. In a conveying system, a main conveyor-belt, and a curved transfer-belt extending across the end of the main belt and terminating at the lower run of said main belt, there being at the end of the main belt a portion of the outer edge of the transfer-belt elevated above the remainder of said transfer-belt.

6. In a conveying system, a main conveyor-belt, a curved transfer-belt extending across the end of the main belt and terminating at the lower run of said main belt, the outer edge of the transfer-belt having a portion higher than the inner edge, and a curved supporting wall extending beneath the upper run of the transfer-belt, the supporting wall having an elevated portion at its upper edge opposite the main belt.

7. In a conveying system, a conveyor-belt having its upper and lower runs arcuate, and means extending along the belt for maintaining said runs in approximately parallel surfaces.

8. In a conveying system, a conveyor-belt having its opposite edges curved about a center lying at one side of the belt, and a wall over which the belt travels, said wall being arranged to support substantially the entire area of a run of the belt.

9. In a conveying system, a conveyor-belt having its opposite edges curved about a center lying at one side of the belt, a supporting wall over which the belt runs, and arcuate supporting walls extending beneath both runs of the belt and between opposite sides of said belt.

10. In a conveying system, an arcuate conveying-belt, rolls over which the belt operates, and means arranged to permit the movement of one of the rolls in the direction of extension of the arc.

11. In a conveying system, a conveying belt having its upper and lower runs lying in approximately parallel surfaces and both being arcuate, supports for the conveyor-runs, rolls at the extremities of the supports over which the conveyor operates, and means arranged to adjust the distance between one of the rolls and the supports.

12. In a conveying system, an arcuate frame including brackets, walls carried by the brackets, rolls rotatable upon the brackets at the extremities of the walls, and a conveyor operating over the rolls and resting upon the walls, said walls extending across the width of the conveyor.

13. In a conveying system, a conveyor-belt, a sprocket chain attached to one edge of the belt, spaced rolls and sprocket-wheels over which the belt and chain respectively operate, and a curved guide-wall extending between the sprocket-wheels and with which the chain contacts.

14. In a conveying system, a conveyor-belt, a sprocket-chain attached to one edge of the belt, spaced rolls and sprocket-wheels over which the belt and chain respectively operate, curved supporting walls extending between the rolls and over which the belt runs, and curved guide-walls rising from the inner edge of the supporting walls and with which the chain contacts.

15. In a conveying system, a conveyor-belt, a second conveyor-belt extending across the extremity of that first named, and a movable conveying device extending between the belts and projecting for different distances from the first belt over the second.

16. In a conveying system, a conveyor-belt, a second conveyor-belt extending across the extremity of that first named, and a movable conveying device traveling over the second to a progressively decreasing extent in the direction of travel of said second belt.

17. In a conveying system, a conveyor-belt a second conveyor-belt extending in a curved path across the extremity of that first named, and a movable conveying device extending between the belts and projecting for different distances from the first belt over the second and having its end curved to correspond thereto.

18. In a conveying system, a plurality of conveyors, and a unitary belt connecting said conveyers and consisting of a plurality of runs decreasing in length in the direction of advance of conveyed objects.

19. In a conveying system, a plurality of conveyors, a single roll situated adjacent to an extremity of one conveyer, a series of rolls opposite the single roll and situated over the second conveyor, and an endless belt extending from one extremity of the single roll in successive runs along said roll and over the series of rolls and returning to the starting point.

20. In a conveying system, a plurality of conveyors, a single roll situated adjacent to an extremity of one conveyor, a series of rolls opposite the single roll and situated over the second conveyor, an endless belt extending from one extremity of the single roll in successive runs along said roll and over the series of rolls and returning to the starting point, a bar curved from the single roll and upon which the series of rolls is mounted, and means arranged to permit the adjustment of the bar toward and from the single roll.

21. In a conveying system, conveyors delivering to one another, and a movable member situated adjacent to a conveyor at the point of delivery and having projections operating in substantial contact with said conveyor and arranged to lift adhering objects therefrom.

22. In a conveying system, a main belt, a transfer-belt extending across the end of the main belt and below the upper run thereof, and a rotatable member having elevating projections movable against the descending portion of the main belt.

23. In a conveying system, a plurality of conveyors, a belt connecting said conveyors and consisting of a plurality of runs, and a brush having fibers extending between the runs of the belt and co-operating with the conveyor.

24. In a conveying system, a plurality of conveyors, a single roll situated adjacent to an extremity of one conveyor and having circumferential series of fibers, a series of rolls opposite the single roll and situated over the second conveyor, and an endless belt extending from one extremity of the single roll in successive runs along said roll between the series of fibers and over the series of rolls and returning to the starting point.

In testimony whereof I have signed my name to this specification.

SIDNEY J. FINN.